Nov. 25, 1924.
P. V. FRÉLY
1,516,595
ELECTRICAL REPRODUCER FOR PHONOGRAPHS
Filed March 30, 1921
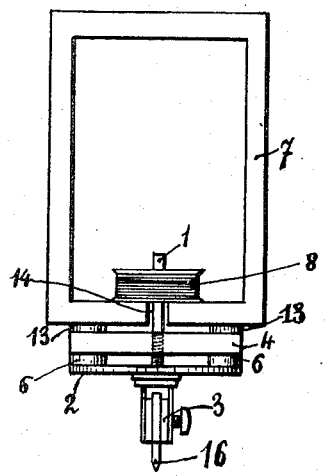
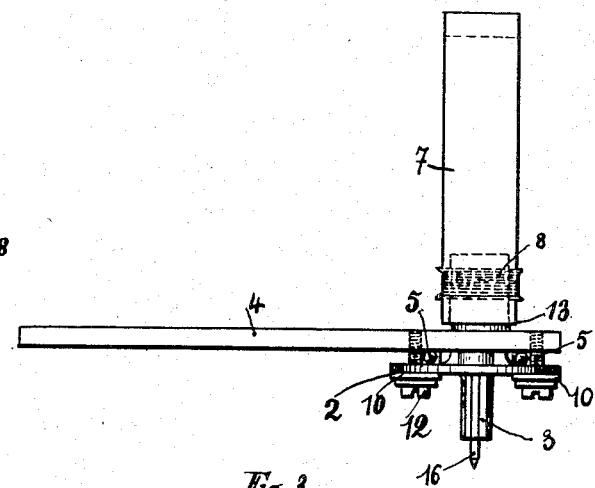
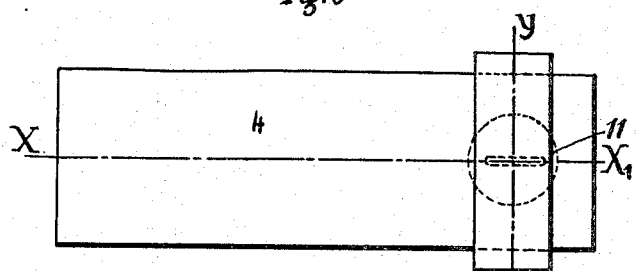
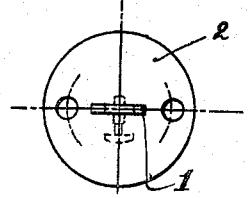
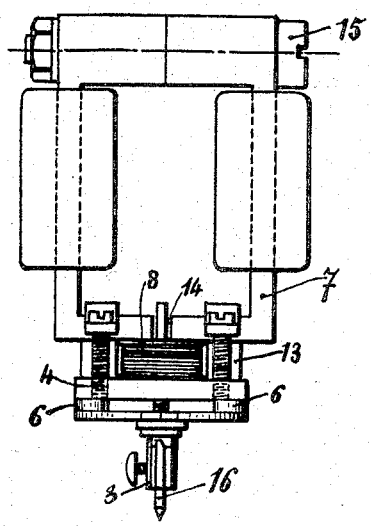
Inventor
Pierre V. Frely,
By B. Singer, Atty.

Patented Nov. 25, 1924.

1,516,595

UNITED STATES PATENT OFFICE.

PIERRE VICTOR FRÉLY, OF PARIS, FRANCE, ASSIGNOR TO SOCIETE DES ETABLISSEMENTS GAUMONT, OF PARIS, FRANCE.

ELECTRICAL REPRODUCER FOR PHONOGRAPHS.

Application filed March 30, 1921. Serial No. 457,148.

*To all whom it may concern:*

Be it known that I, PIERRE VICTOR FRÉLY, residing in Paris, France, have invented new and useful Improvements in Electrical Reproducers for Phonographs, of which the following is a specification.

The invention relates to electrical reproducers for phonographs, which are especially intended to be applied to phonographs in which the waves are parallel to the surface, the furrow having a constant depth but a sinous outline.

This reproducer is constituted by a small magneto-electric oscillating machine which generates an electro-motive force corresponding with the amplitude and the shape of the line traced on the phonogram.

This apparatus is an improvement of the reproducer disclosed in United States Patent No. 1,384,295 granted July 12, 1921, to Henri Armagnat and myself. Relatively to this reproducer, the reproducer constructed in accordance with this invention has the advantage to generate greater electromotive forces while permitting a more accurate reproduction.

The annexed drawings represent an apparatus in conformity with the invention.

Fig. 1 is an elevation view.

Fig. 2 is a side view.

Fig. 3 is a plane view.

Figs. 4 and 5 are elevation view and plane view of the oscillating device which follows the phonographic furrow.

Fig. 6 shows a modified device in which the coil is located between the magnet and the support, the permanent magnet being superseded by an electro-magnet.

On Fig. 1 it is seen that the blade 1 of soft iron or steel laminated or not, bears at its lower part a metallic flange 2. This flange bears a style holder 3 supporting the needle or saphir 16 which follows the phonographic furrow. An opening 11 is provided in a support 4. The blade 1 passes through the said opening and can move freely therein.

On either side of the blade 1 are suitably arranged along the axis X $X_1$, two steel balls 5 or the like (for instance pins, or blades). In the example represented, the balls 5 are located in seats provided in the support 4 and are pressed against that support by screws 12. These screws are threaded in the support 4 and pass freely through holes in the flange 2. Their heads bear on this flange so as to tighten the balls 5 (or the like). Elastic washers 10 are interposed between the heads of the screws and the flange 2 so as to cause compression on the balls 5 (or the like) without interfering with the oscillations that take place perpendicularly to the vertical axis of the blade 1. The washers have a sufficient thickness and are either of rubber, wool or other suitable material.

Two others washers 6 constructed in a resilient and aperiodic material, as the previously mentioned washers are located between the oscillating member 2 and the support 4 in the direction of the oscilliating movement i. e. along Y $Y_1$. The purpose of these washers is to act as dampers. Any other suitable means may be employed within the scope of the appended claims.

The support 4 bears a permanent magnet 7 or an electro-magnet, laminated or not. It may be advisable to interpose between the support 4 and the magnet 7 some washers 13 of felt, wool, cork, rubber, or sheets of these substances separated from each other by paper sheets.

The magnet has at its lower part at 14 an air gap in which the blade 1 oscillates, the said blade 1 being in its rest position along the axis of a hollow core of a spool 8 which surrounds it without touching it.

The apparatus previously described operates as follows:

When the style-holder 3, follows a recording furrow, it oscillates and it transmits this motion entirely to the blade 1 since the members 1, 2, 3, 16 form a rigid system.

As the mass of the support 4 and of the magnet 7 presents a great inertia, the whole of these members does not participate in the oscillations of the solidary members 1, 2, 3, 16, consequently the blade 1 will come alternately near to each of the edges of the gap 14, i. e. near to the poles of the magnet.

Each of the movements of the blade modifies the magnetic flux in the core of the spool 8. Each of the variations of flux created by the oscillations of the blade 1 generates by induction an electromotive force in the coils of the spool 8, and this electromotive force depends on the amplitude and on the period of the said oscillations, i. e. on the amplitude and on the period of the phonographic furrow.

It will be thus possible with such apparatus to reproduce at a distance by means of a telephone connected with the spool the same sounds as if the phonogram was reproduced directly by saphir acting mechanically on a vibrating diaphragm.

To adjust the electromotive force the spool may be raised by a suitable length above the air gap, for instance by interposing a plate of suitable thickness, between the magnet and the spool.

On Fig. 6, a modified device has been represented by way of example. The coil 8 in which the induced currents are generated is located between the electro-magnet 7 and the support 4, the upper end of the blade 1 oscillating between the northern and southern poles of the magnet.

Besides with a longer oscillating blade it is possible to provide another spool (non-represented) located above the horizontal branches of the magnet, in the same manner as the spool 8 of Figs. 1 and 2.

In this latter case, both spools can be electrically connected.

In order to facilitate the mounting and dismounting, the upper part of the magnet core is in two pieces fixed by means of a bolt 15.

It is to be observed that the support 4 is suitably connected with an arm which is suitably pivoted in the same way as the arm carrying the style holder in an ordinary phonograph. Besides it is possible to read phonograms in which the recording vibrations are perpendicular to the surface of the disc, the furrows being circular but having a variable depth; in that case, the previously described apparatus is in a position perpendicular to the aforesaid position, the support being modified accordingly.

It is well understood that any other detail addition or modification can be made without departing from the frame of the present invention.

I claim—

1. An electric reproducer for phonographs comprising a supporting element for attachment to a phonograph arm, a magnet having its poles presented to one side of said supporting element, a stylus carrying element having an extension arranged between the poles of the magnet, a coil at the poles of the magnet and which the said extension passes, and means connecting said stylus carrying element to the support, said connecting means permitting oscillations of the extension of said stylus carrying element between the magnet poles to cause the same to modify the magnetic flux in the core of the coil, said stylus carrying element also having a disc arranged opposite said supporting element, the said connecting means being arranged between said disc and said supporting element.

2. An electric reproducer for phonographs comprising a supporting element for attachment to a phonograph arm, a magnet having its poles presented to one side of said supporting element, a stylus carrying element having an extension arranged between the poles of the magnet, a coil at the poles of the magnet and which the said extension passes, and means connecting said stylus carrying element to the support, said connecting means permitting oscillations of the extension of said stylus carrying element between the magnet poles to cause the same to modify the magnetic flux in the core of the coil, said stylus carrying element also having a disc arranged opposite said supporting element, the said connecting means being arranged between said disc and said supporting element and comprising a pair of spherical members arranged between said supporting element and said disc and diametrically opposite each other, and a pair of members also arranged between said supporting element and said disc and diametrically opposite each other and midway between the said spherical members.

3. An electric reproducer for phonographs comprising a supporting element for attachment to a phonograph arm, a magnet having its poles presented to one side of said supporting element, a stylus carrying element having an extension arranged between the poles of the magnet, a coil at the poles of the magnet and which the said extension passes, means connecting said stylus carrying element to the support, said connecting means permitting oscillations of the extension of said stylus carrying element between the magnet poles to cause the same to modify the magnetic flux in the core of the coil, said stylus carrying element also having a disc arranged opposite said suporting element, the said connecting means being arranged between said disc and said supporting element and comprising a pair of spherical members arranged between said supporting element and said disc and diametrically opposite each other, and a pair of members also arranged between said supporting element and said disc and diametrically opposite each other and midway between the said spherical members, and means to vary the degree of compression between said supporting element and disc and said members.

4. An improved electromagnetic reproducer for phonographs comprising an iron or smooth steel plate forming the prolongation of the stylus and having a disc connected by flexible connection to a support and arranged to oscillate between the poles of a magnet and in an inductor element, the said flexible connection comprising balls, arranged between the disc and support and screws passing through the disc with a play sufficient to permit the oscillations, and spring washers of elastic substance disposed between the fixed and movable parts.

In witness whereof I affix my signature.

PIERRE VICTOR FRÉLY.